United States Patent [19]
Eppler

[11] Patent Number: 6,084,989
[45] Date of Patent: *Jul. 4, 2000

[54] SYSTEM AND METHOD FOR AUTOMATICALLY DETERMINING THE POSITION OF LANDMARKS IN DIGITIZED IMAGES DERIVED FROM A SATELLITE-BASED IMAGING SYSTEM

[75] Inventor: Walter G. Eppler, Saratoga, Calif.

[73] Assignee: Lockheed Martin Corporation, Bethesda, Md.

[*] Notice: This patent issued on a continued prosecution application filed under 37 CFR 1.53(d), and is subject to the twenty year patent term provisions of 35 U.S.C. 154(a)(2).

[21] Appl. No.: 08/749,804

[22] Filed: Nov. 15, 1996

[51] Int. Cl.[7] ................................................ G06K 9/32
[52] U.S. Cl. .......................... 382/293; 382/103; 382/106; 382/108; 382/109; 382/181; 382/190; 382/199; 382/201; 382/203; 382/204; 382/209; 382/213; 382/217; 382/295; 382/298; 382/299; 348/144; 364/456
[58] Field of Search ............................. 348/144; 382/106, 382/103, 108, 109, 203, 181, 157, 190, 199, 204, 209, 217, 213, 295, 299, 298, 151, 254; 364/456

[56] References Cited

U.S. PATENT DOCUMENTS

| | | | |
|---|---|---|---|
| 5,093,869 | 3/1992 | Alves et al. | 382/5 |
| 5,179,638 | 1/1993 | Dawson et al. | 395/125 |
| 5,275,354 | 1/1994 | Minor et al. | 244/3.17 |
| 5,596,494 | 1/1997 | Kuo | 364/420 |
| 5,612,901 | 3/1997 | Gallegos et al. | 364/525 |
| 5,625,409 | 4/1997 | Rosier et al. | 348/117 |

Primary Examiner—Matthew C. Bella
Assistant Examiner—Sheela Chawan
Attorney, Agent, or Firm—Kenneth W. Float

[57] ABSTRACT

A system and method for determining offset errors between line and pixel coordinates of landmarks in a digitized image generated by an imaging system disposed on a spacecraft and line and pixel coordinates predicted by a mathematical model of the imaging system using landmark geodetic coordinates on the Earth. The system and method use landmarks in symbolic form, such as perimeters of lakes and islands that are stored in a database. A digitized image generated by the satellite-based imaging system is processed to extract a patch of the image containing a landmark. The image patch is then upsampled (magnified). The landmark boundary is processed using a mathematical model of the imaging system to generate absolute coordinates of the boundary pixels, which are upsampled and rasterized to produce a landmark mask. The landmark mask and the upsampled image patch are then processed by one or more matching algorithms to generate line and pixel offset error values indicative of the offset between the predicted position of the landmark and the actual position of the landmark in the image. A match figure of merit is also generated that is indicative of the reliability and accuracy of the computed offset. Optionally, the upsampled image patch is processed using an image enhancement algorithm that increases the contrast and robustness of the images by converting pixel gray scale values into likelihood ratios.

20 Claims, 4 Drawing Sheets

SYSTEM AND METHOD FOR AUTOMATICALLY DETERMINING THE POSITION OF LANDMARKS IN DIGITIZED IMAGES DERIVED FROM A SATELLITE-BASED IMAGING SYSTEM

BACKGROUND

The present invention relates generally to satellite-based imaging systems, and more particularly, to a system and method for processing digitized images generated by a satellite-based imaging system to locate landmarks in the images that are used to automatically determine the position and attitude of the imaging system.

The assignee of the present invention has developed and deployed a Geostationary Operational Environmental Satellite (GOES) satellite that contains an imaging system that operates in both the visible and infrared regions of the spectrum and generates digitized images of the Earth. The digitized images generated by the imaging system are used for a variety of purposes, such as monitoring and analyzing flash floods and determining wind velocity by tracking cloud motion, for example.

To properly utilize the digitized images of the Earth, it is important to precisely know the location of the image pixels on the Earth. Accurate, stable image registration requires that orbit and attitude parameters of the satellite on which the imaging system is located be determined with great precision. These parameters can be derived by fitting line and pixel image coordinates of salient features, or landmarks, to their known latitude, longitude, and height on the Earth.

Registration accuracy of the images generated by the imaging system is accomplished by automatically determining the positions in the digitized images of landmarks on the Earth having known geodetic coordinates. The image analysis process measures offset error values indicative of the misregistration between the actual position of the landmarks in the digitized images and the desired position of the landmarks, and these offset error values are used to adjust the optical line of sight of the imaging system to produce optimum registration.

In the past, the position of a landmarks in a digitized images was automatically determined using reference images derived from previously acquired digitized images containing the landmark that were matched to the landmark in the currently processed digitized image. This approach has two problems. The exact position of the reference image was not known with subpixel accuracy. Also, several different reference images were needed to match landmarks contained in the currently processed image when the reference images were obtained under different diurnal and seasonal conditions.

Accordingly, it is an objective of the present invention to provide for a system and method for processing a digitized image generated by a satellite-based imaging system for measuring error values that are indicative of the misregistration between the actual position of the landmarks in the digitized images and the desired position of the landmarks, which error values are used to adjust the optical line of sight of the imaging system to produce optimum registration.

SUMMARY OF THE INVENTION

To meet the above and other objectives, the present invention provides for a system and method that processes a digitized image generated by a satellite-based imaging system and generates error values indicative of the misregistration between the actual position of the landmarks in the digitized images and their desired position. The error values are then used to adjust the optical line of sight of the imaging system to produce optimum registration.

The present system and method automatically determines line and pixel coordinates of landmarks in the digitized image with subpixel accuracy. The system and method use landmarks in symbolic form, and in particular, perimeters of lakes and islands, derived from precise cartographic source materials. A large number of landmarks in symbolic form are stored in a database.

A digitized image generated by the satellite-based imaging system is processed to extract a patch of the image containing a particular landmark. The absolute coordinates of the upper left corner of the image patch are determined. The patch of the image containing the landmark and the surrounding region are extracted from the image frame. The image patch is then upsampled (magnified). A list of coordinates for landmark boundary vertices of the corresponding landmark stored in the database is processed through a mathematical model of the imaging system to generate absolute coordinates of the boundary pixels of the landmark. The absolute coordinates of the boundary pixels of the landmark are upsampled (magnified) and rasterized to produce a landmark mask.

The landmark mask and the upsampled image patch containing the landmark are then processed by one or more matching algorithms. Six alternative algorithms may be employed in the present invention, which are selected based upon the image acquisition conditions. The matching algorithms generate row and column offset error values indicative of the offset between the actual position of the landmark and the desired position of the landmark in the image (defined by the landmark geodetic coordinates stored in the database). A match figure of merit is also generated that is indicative of the reliability and accuracy of the computed offset.

Optionally, the landmark mask and the upsampled image patch containing the landmark are processed using an image enhancement algorithm that increases the contrast and robustness of the images by converting pixel gray scale values into likelihood ratios, that is whether the each pixel is part of the landmark or part of the land or water surrounding the landmark. Using the image enhancement algorithm, the computed likelihood ratios along with the landmark mask are processed by the matching algorithms to generate the offset errors and match figure of merit.

The present invention thus generates offset errors that are subsequently processed to adjust the pointing direction of the imaging system. The offset error values are processed by an orbit and attitude tracking system (OATS) that generates coefficients used for satellite orbit and attitude prediction. The coefficients are processed onboard the satellite by an orbit and attitude prediction system and an image motion compensation system to generate pointing commands that are used to adjust the pointing direction of the imaging system.

In developing the present invention, hundreds of satellite images containing over 30 different landmarks were tested to determine which matching algorithm gave the most reliable and accurate results. The position of the landmark in the digitized image is accurately determined automatically using the present invention using both visible and infrared images under a wide range of acquisition conditions. The present invention is well suited for operational use in processing digitized images of the Earth because a large number of landmarks are available worldwide.

The present invention has a number of advantages over known conventional approaches. The present invention more accurate, having an accuracy of one-quarter pixel. The present invention accommodates to diurnal and seasonal variations in image acquisition conditions. Also, the present invention is more reliable in the presence of cloud cover.

The present invention is novel when compared to prior art approaches in that it represents landmark reference data (landmarks) in symbolic form rather than in terms of gray scale intensity values. The present invention uses small, completely enclosed landmark features to improve accuracy and reliability. The present invention upsamples (magnifies) the digital gray scale image to increase the resulting positional accuracy. The present invention eliminates cloud pixels to improve the match accuracy and reliability. The present invention optionally enhances the digital gray scale images prior to matching to improve reliability in the presence of diurnal and seasonal variations.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
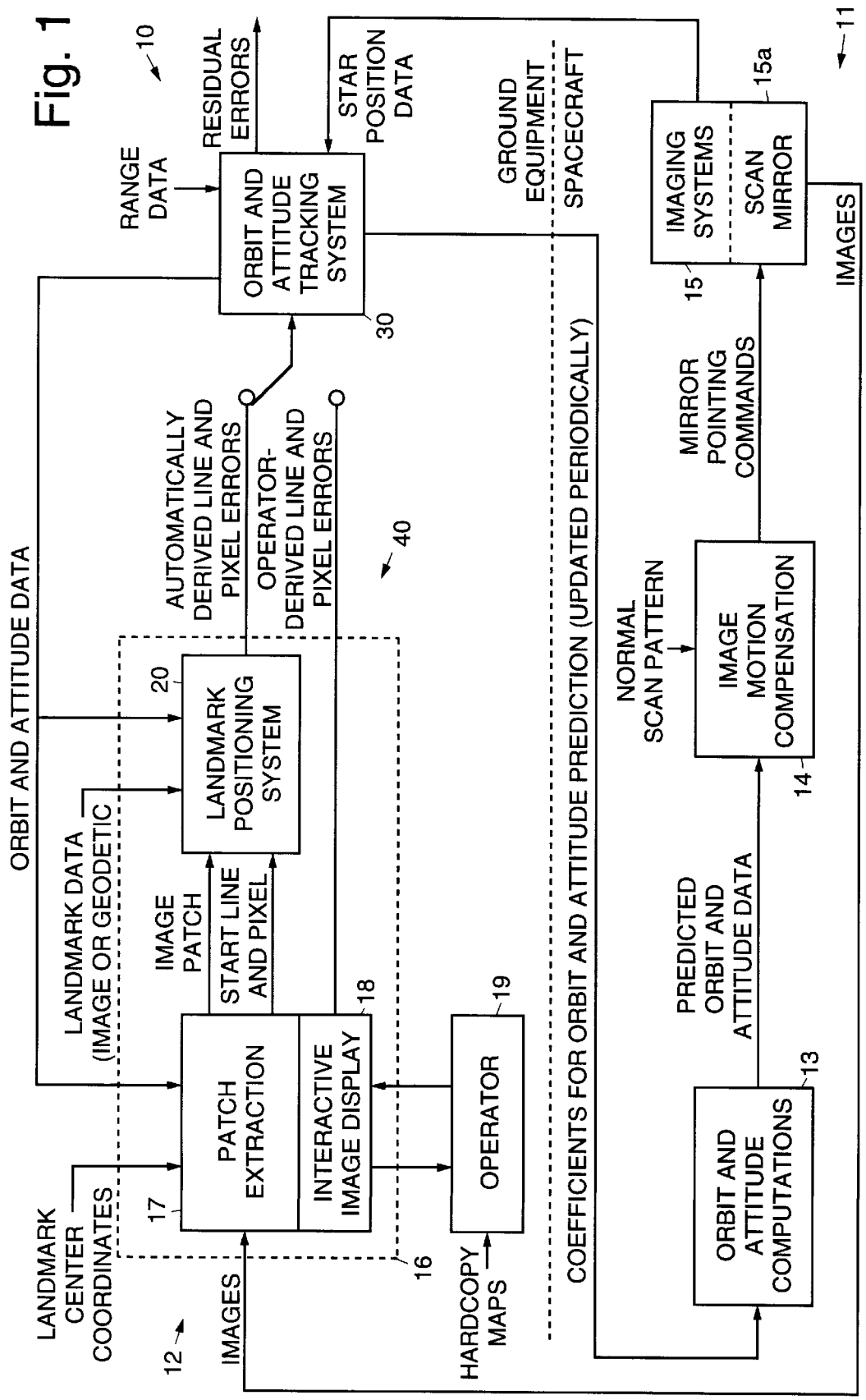
FIG. 1 is a block diagram illustrating a geostationary operational environmental satellite (GOES) system that employs a landmark position system and method in accordance with the principles of the present invention.

Referring to the drawing figures, FIG. 1 is a block diagram illustrating a geostationary operational environmental satellite (GOES) system 10 that employs a landmark position system 20 and method 40 in accordance with the principles of the present invention. The GOES system 10 includes a spacecraft 11, or satellite 11, and ground equipment 12 that communicates with the spacecraft 11. The spacecraft 11 includes an orbit and attitude compensation system 13, an image motion compensation system 14, and two imaging systems 15 (known as the imager and sounder 15). The orbit and attitude compensation system 13, image motion compensation system 14, and imaging system 15 are described in "Geostationary Operational Environmental Satellite, GOES I-M System Description", by John Savides, Space Systems/Loral, December, 1992 and "GOES I-M System Databook", Space Systems/Loral, DRL 101-08.

The ground equipment 12 comprises a computer system 16 that implements an image patch extraction algorithm 17, and includes an interactive image display 18 that an operator 19 may use to process images, and includes the present landmark position system 20. The ground equipment 12 also comprises an orbit and attitude tracking system (OATS) 30 that interfaces with the spacecraft 11 to correct or adjust the line of sight of the imaging systems 15 in response to signals generated by the landmark position system 20. Details of the orbit and attitude tracking system 30 are generally well known, and may be found in U.S. Pat. No. 4,688,092, the contents of which are incorporated herein by reference.

The imaging system 15 includes a pointing mirror 15a that produces an image of the Earth. The orbit and attitude computation system 13 processes signals sent to it from the ground equipment 12, and generates predicted orbit and attitude data. The predicted orbit and attitude data is processed by the image motion compensation system 14 to generate image motion compensation signals in the form of mirror pointing commands that are sent to the imaging system 14 to correctly point the mirror 15a. In addition, the imaging system 15 transmits star position data to the orbit and attitude tracking system 30 that is processed to produce data that are used to adjust the pointing direction of the imaging system 15.

Digitized images generated by the imaging system 15 and transmitted to the ground equipment 11 are processed by the patch extraction algorithm 17. The digitized images produced by the GOES system 10 are very large, and are approximately 10,000 lines by 20,000 pixels. The patch extraction algorithm 17 extracts an image patch from the transmitted image, which is a 25 line by 40 pixel block of pixels surrounding a particular landmark in the block of pixels. The patch extraction algorithm 17 also outputs data indicative of the start line and pixel (i.e., absolute frame coordinates) of the upper left corner of the extracted image patch or block of pixels. The block of pixels comprising the extracted image patch along with the upper left corner coordinates of the extracted image patch are supplied to the landmark position system 20 for processing. In addition, landmark data regarding the landmark contained in the extracted image patch is retrieved from a database 27 and is supplied to the landmark position system 20. Orbit and attitude data regarding the satellite 11 are also supplied to the landmark position system 20 from the orbit and attitude tracking system.

The landmarks stored in the landmark database 27 are each defined by geodetic coordinates of vertices of their perimeter. Preparation of the landmark database 27 employed in the reduced to practice embodiment of the system 20 and method 40 was done in two phases. Large areas were screened to identify appropriate features (i.e., lakes and islands) for landmarks. A list of names and center coordinates of more than 100 landmarks was generated for use in the system 20 and method 40. The exact geodetic coordinates (i.e., latitude, longitude, and height, given by $\phi$, $\lambda$ and H in FIG. 2) of points on the perimeter of each landmark were determined and stored in the database 27. The Common Mapping Toolkit (CMTK) geographic information system 27 was used to generate the landmark vertices comprising the perimeter.

The landmarks are represented and stored in symbolic form, and specifically vertices defining the perimeter of islands or lakes. To produce the landmarks, the first step is to screen very large geographic areas (e.g., full earth disks) to identify islands and lakes having the proper size, shape, and orientation. This results in a list of landmarks with their corresponding parameters, such as latitude, longitude, alphanumeric identifier, name, and type of feature, for example. Once a feature has been selected using landmark selection criteria 26, the exact geodetic coordinates of perimeter vertices are read out as a sequence of latitude and longitude values as an operator traces out the perimeter on an interactive softcopy map display. The perimeter vertices are stored in the landmark database 27 as a variable length file of floating point numbers in ASCII format.

For example, landmarks comprising perimeters of lakes and islands derived from precise cartographic maps, and the like, are used in the landmark position system 20 to precisely determine the amount of misregistration between the actual position of the landmark in the extracted image patch and the desired position of the landmark. The misregistration data includes offset errors and a match figure of merit. The offset errors correspond to the difference between the location (line and pixel position) of the landmark in the extracted image patch and the predicted location (line and pixel position) of the landmark perimeter.

The landmark position system 20 processes the supplied data to generate line and pixel (line and pixel) error values corresponding to the offset errors. The line and pixel error values are supplied to the orbit and attitude tracking system 30 which generates orbit and attitude prediction coefficients that are processed by the orbit and attitude computation system 13 on the spacecraft 11 to predict the orbit and attitude of the spacecraft 11.

Alternatively, the operator 19 may use the cursor on the interactive image display 18 to designate the line-pixel address associated with geodetic coordinates of salient features marked on hardcopy maps. The errors between the manually measured landmark position and the desired position are supplied to the attitude tracking system 30 which generates orbit and attitude prediction coefficients therefrom.

In either case, the orbit and attitude computation system 13 processes orbit and attitude prediction coefficients to produce orbit and attitude data that is supplied to the image motion compensation system 14. The image motion compensation system 14 processes the data generated by the computation system 13 and produces mirror pointing coordinates that are supplied to the imaging system 15. The imaging system 15 processes the mirror pointing commands to adjust the pointing direction of the line of sight of a pointing mirror 15a.

Figure 2:
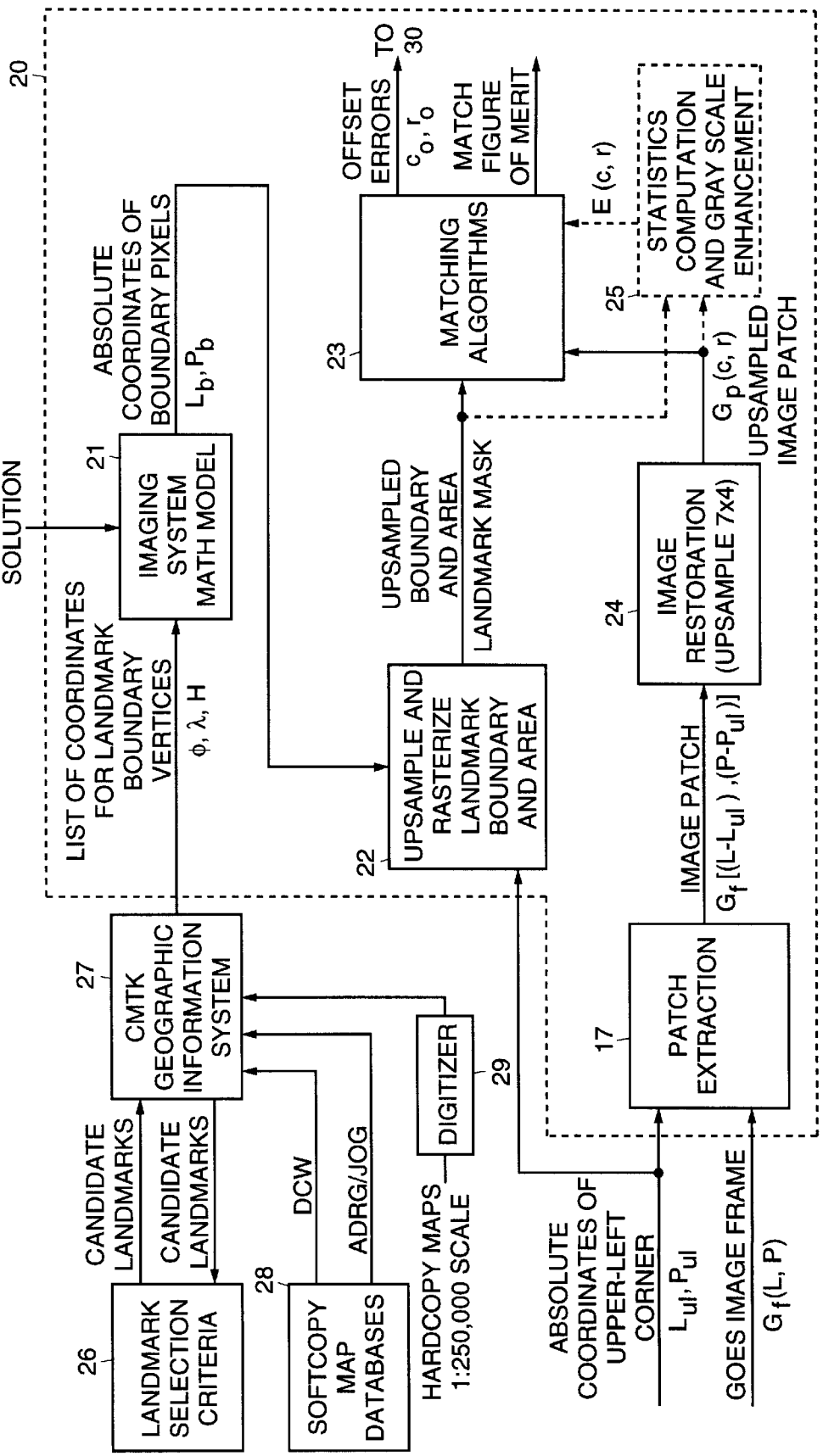
FIG. 2 a block diagram illustrating details of the landmark position system and method of the present invention.

FIG. 2 a block diagram illustrating details of the landmark position system 20 along with other portions of the GOES system 10 with which it interacts. The present processing method 40 is also illustrated in FIG. 2. Candidate landmarks are selected using landmark selection criteria 26 together with softcopy and hardcopy databases 28 such as a Digital Chart of the World (DCW) and ARC Digitized Raster Graphics (ADRG) maps derived from Joint Operation Graphic (JOG) hardcopy maps, and user-digitized hardcopy maps in GIF format digitized using a digitizer 29. The DCW is a worldwide, seamless, thematic, vector map derived from hardcopy maps at a scale of 1:1,000,000. Data comprising the candidate landmarks, DCW vector map, ADRG JOG map, or user-digitized hardcopy map are input to a Common Mapping Toolkit (CMTK) geographic information system 27 developed by the Air Force modified for use with the present invention. The modified CMTK geographic information system 27 is used to generate a list of coordinates for landmark boundary vertices ($\phi$, $\lambda$, H) which are input to the landmark position system 20.

The existing Common Mapping Toolkit (CMTK) geographic information system 27 was modified for use in the landmark position system 20 so that it creates an icon that represents a 12-line by 21-pixel image footprint on the Earth for either visible or infrared images generated by the imaging system 15. This footprint is superimposed on the DCW display and allows an analyst to judge whether a candidate island or lake has the required size, shape, and orientation.

The landmark position system 20 comprises a mathematical model 21 of the imaging system 15. A current orbit and attitude determination (OAD) solution is input to the mathematical model 21 along with the list of coordinates for landmark boundary vertices generated by the CMTK geographic information system 27 which processes the inputs to generate absolute coordinates of the landmark boundary pixels ($L_b$, $P_b$). The orbit and attitude determination (OAD) solution is obtained by a least-squares fit of landmarks measured on previous images frames. The absolute coordinates of the landmark boundary pixels along with the absolute coordinates of the upper left corner of the image patch are supplied to an upsample and rasterizing algorithm 22 which upsamples (magnifies) and rasterizes the boundary and area of the candidate landmark. The landmark boundary is formed by connecting the perimeter vertices on the image pixel raster with straight line segments. The area bitmap is formed by filling in all pixels within the closed boundary with "ones". The upsampled boundary and area data are processed by one or more matching algorithms 23 that produce column and row offset errors ($c_o$, $r_o$) and a figure of merit regarding the match between the predicted landmark and the actual landmark in the image. The matching algorithms 23 will be described in more detail below.

The absolute coordinates of the landmark boundary pixels are also supplied to an image patch extraction algorithm 17. The image patch extraction algorithm 17 uses the absolute coordinates (line and pixel location) of the upper left corner of the patch ($L_{ul}$, $P_{ul}$) and the frame of imagery $G_f(L,P)$ to extract an image patch (a portion of the image) given by $G_f[L-L_{ul})$, $(P-P_{ul})]$. The image patch is input to an image restoration algorithm 24 that upsamples the image patch to generate an upsampled image patch ($G_p(c,r)$) that is applied to an optional statistics computation and gray scale enhancement algorithm 25. The upsampled boundary and area data are also input to the enhancement algorithm 25. The enhancement algorithm 25 forms an enhanced version of the image E(c,r) which is input to selected ones of the matching algorithms 23 for processing to compute the offset errors. The enhancement process, to be described in detail later, produces an enhanced image patch E(c, r) having greater contrast with no contrast reversals. In any case, the computed offset errors are supplied to the orbit and attitude tracking system 30 which processes the offset errors to generate the orbit and attitude prediction coefficients.

Six different image matching algorithms 23 were investigated for use in the present invention using a large number of visible and infrared images of many different landmarks. The image matching algorithms 23 include centroid image matching, edge matching, cluster reward, minimum variance, cross correlation, and normalized cross correlation algorithms 23. Each of the image matching algorithms 23 may be selectively employed in the present system 20 and method 40. The basis of operation and the characteristics of these algorithms 23 are discussed below.

The centroid image matching algorithm 23 may be used to match the derived landmark mask with the landmark in the GOES image. Because it is difficult to program a computer to recognize salient features such as a "cusp of an inlet cove", for example, a simpler characterization is used in the present system 20 and method 40; namely, the centroid of the landmark. In the present system 20 and method 40, the landmark perimeter vertices coordinates are projected onto the image and used to compute the line and pixel coordinates of the centroid (i.e., center of mass) of the landmark mask bitmap. The gray-scale image is then thresholded to form a bitmap whose centroid is computed. The offset error is the difference between the two centroid locations. The centroid approach is simple and fast, but is not accurate if there are clouds anywhere in the patch.

In the centroid image matching algorithm 23, a bitmap (ones and zeros) $B_g$ is formed by thresholding the GOES image. The column and row centroid values $C_g$ and $R_g$ are computed using the equations:

$$\overline{C} = \frac{1}{IJ}\sum_{c=0}^{I-1}\sum_{r=0}^{J-1} cB(c,r); \quad \overline{R} = \frac{1}{IJ}\sum_{c=0}^{I-1}\sum_{r=0}^{J-1} rB(c,r).$$

The landmark bitmap $B_l$ is formed by filling in the landmark perimeter. The column and row centroid values $C_l$ and $R_l$ are computed using these equations. The row and column offset errors are computed using the following equations:

$$\Delta c = \overline{C}_g - \overline{C}_l; \quad \Delta r = \overline{R}_g - \overline{R}_l.$$

The centroid image-matching algorithm is the simplest to understand and implement and requires the least computer execution time. The problem with this approach is that it gives an incorrect position estimate if there is a cloud anywhere in the patch. A cloud causes extraneous ones in the thresholded bitmap $B_g$ and causes errors in computing $C_g$, $R_g$, $\Delta c$ and $\Delta r$.

The edge matching algorithm achieves location accuracy by matching a large number of edge points in the image to the projected landmark perimeter. The edges are detected using a Laplacian-of-Gaussian algorithm given in a paper by D. Marr et al., "Theory of Edge Detection", *Proc. Roy. Soc. Lon. B.*, vol. 207, 1980, p. 187–217. These edges result from both the landmark and clouds. The edge matching is carried out by blurring the edges using a nearest edge transform described in a paper by G. Borgefors, "Distance Transformations in Digital Images", *Comput. Vision Graphics Image Process.*, vol. 34, 1986, p. 334–371 and D. Paglieroni, entitled "A Unified Distance Transform Algorithm and Architecture", Mach. Vision Appl., vol. 5, 1992, p. 47–55 to form the image $D(c,r)$; the value $D$ at any pixel $(c,r)$ represents the distance from that pixel to the nearest edge pixel. This approach is relatively insensitive to variations in gray-scale intensity and cloud cover anywhere in the image patch.

The landmark perimeter is represented as ones in the bitmap $L(c,r)$. The match metric $\rho$ for all offsets $(c_o, r_o)$ is computed using the equation:

$$\rho(c_o, r_o) = \frac{1}{N}\sum_{c=0}^{I-1}\sum_{r=0}^{J-1} L(c,r)D[(c+c_o),(r+r_o)]$$

$$= \frac{1}{N}\sum_{n=0}^{N-1} D\{[c(n)+c_o],(r(n)+r_o)]\}.$$

According to the equation:

$$\rho(\hat{c}_o, \hat{r}_o) = \text{Min } \rho(c_o, r_o),$$

the best estimate $(\hat{c}_o, \hat{r}_o)$ is that offset which minimizes $\rho$; i.e., the one which minimizes the sum of distances between the landmark perimeter pixels and edge pixels.

An alternative formulation uses the fact that only perimeter pixels contribute to $\rho$ so they can be stored and used in the form of a list instead of a raster. This formulation, given by the second expression for $\rho$, reduces memory storage and computer execution time because both depend on landmark perimeter length instead of its area.

One of the advantages of the edge matching algorithm is that it is relatively insensitive to cloud cover. The extraneous edges caused by clouds do not contribute to the values of $\rho(c_o, r_o)$ in the vicinity of the correct offset $(\hat{c}_o, \hat{r}_o)$. Even when the cloud is located over the landmark perimeter, it does not cause a significant error in the position estimate. This is because the contributions of cloud edges along the landmark perimeter are nearly constant (in the vicinity of the correct offset) and do not shift the match surface peak location.

The cluster reward, minimum variance, cross correlation, and normalized cross correlation are area-based algorithms 23 that all operate to maximize the agreement between the landmark area in a binary bitmap and the landmark area in a gray-scale image. The landmark bitmap (i.e., mask) is formed by filling in with "ones" the area inside the perimeter obtained by connecting the prestored vertices. The bitmap has $N_l$ ones and $N_s$ zeros where $N_l + N_s = N_t = IJ$. The landmark (e.g., an island) has a gray-scale value $G_l$. The surround area (e.g., water) has the gray-scale value $G_s$. The mask is positioned (i.e., shifted) over the image so that the upper-left corner is at $c_o, r_o$. There are $\tilde{N}$ pixels where the landmark mask (i.e., ones) coincide with image pixels in the surround area. The four area-based algorithms operate to minimize $\tilde{N}$.

The cluster reward algorithm, described in the paper by C. D. Kuglin entitled "Histogram-Based Algorithms for Scene Matching", SPIE, vol. 302, Infrared Technology for Target Detection and Classification (1981), operates by forming the histogram of gray-scale intensity values of pixels inside the shifted, projected landmark perimeter. The cluster reward algorithm takes as its position estimate that offset at which the histogram is most clustered (i.e., narrowest and highest peaks). This algorithm is well suited for applications in which gray-scale "contrast reversals" are a problem. However, when landmarks are small the cluster reward algorithm can have a false match for offsets that are completely misregistered and therefore is not preferred for use in the present system 20.

The cluster reward algorithm is defined by the equations:

$$\rho(c_o, r_o) = \sum_{All\ G} N^2(G/c_o, r_o)$$

$$\rho(\hat{c}_o, \hat{r}_o) = \text{Max}\,\rho(c_o, r_o).$$

For each offset $(c_o, r_o)$ a histogram is formed using all pixels under the landmark area (i.e., ones) of the bitmap. The number of pixels having gray-scale value $G$ is $N(G/c_o, r_o)$. As shown in the first equation above, the match metric $\rho(c_o, r_o)$ is sum of squares of histogram values. The second equation shows that the position estimate $(\hat{c}_o, \hat{r}_o)$ is that offset which maximizes $\rho(c_o, r_o)$.

The squaring operation in the first equation rewards histograms having fewer gray-scale values occurring more frequently. For example, histograms for the case where the landmark and surround are perfectly homogeneous have values $G_l$ and $G_s$, respectively. There are $\tilde{N}$ occurrences of $G_s$ when the mask is misregistered. The sum of histogram values for both $G_l$ and $G_s$ is $N_l$, the number of ones in the mask. The histogram collapses to a single line having $N_l$ occurrences at $G_l$ when the mask is perfectly registered.

Substituting the values from the first case into the first equation yields:

$$\rho(c_o, r_o) = N_l^2 - 2[N_l - \tilde{N}(c_o, r_o)]\tilde{N}(c_o, r_o)$$

which is the match metric $\rho$ in terms of $\tilde{N}$. $\rho$ does not depend on the values of $G_l$ and $G_s$; the cluster reward is intensity-independent and insensitive to contrast reversals. The last equation shows that ρ has a maximum at $\tilde{N}=0$, where the mask is perfectly registered so that the second equation gives the correct position. However, ρ has another maximum at $\tilde{N}=N_l$, where the mask is completely misregistered. The cluster reward algorithm 23 can give a false match when using simple scenes as landmarks.

The minimum variance algorithm, described in the paper by C. D. Kuglin, et al., "Map Matching Techniques for Use with Multispectral/Multitemporal Data", SPIE 24th Annual Technical Symposium, Jul. 28–Aug. 1, 1980, San Diego, Calif., operates by computing the variance of gray-scale intensity values of pixels inside the shifted, projected landmark perimeter. These equations are:

$$V(c_o, r_o) = \sum_{(c,r) \in L(c_o, r_o)} [G(c, r) - \overline{G}(c_o, r_o)]^2$$

$$\overline{G}(c_o, r_o) = \frac{1}{N_1} \sum_{(c,r) \in L(c_o, r_o)} G(c, r)$$

$$V(\hat{c}_o, \hat{r}_o) = \text{Min } V(c_o, r_o),$$

where $(c,r) \in L(c_o, r_o)$ means all pixels in the image within the landmark perimeter offset by $(c_o, r_o)$.

The minimum variance algorithm takes as its position estimate that offset at which the variance is minimum. This algorithm is well suited for applications in which gray-scale "contrast reversals" are a problem. Like the cluster reward algorithm, the minimum variance algorithm can have a false match for offsets which are completely misregistered and therefore is not preferred for use in the present system 20.

The average and the variance are computed for all gray-scale pixel values within the landmark perimeter. These values are designated $\overline{G}(c_o, v_o)$ and $V(c_o, r_o)$, respectively. The rationale for this image matching algorithm 23 is that the variance should be less if the perimeter contains only landmark pixels than if it contains a mixture of landmark and surround pixels. The position estimate $(\hat{c}_o, \hat{r}_o)$ is that offset which minimizes the variance.

The equation:

$$V(c_o, r_o) = \frac{[N_1 - \tilde{N}(c_o, r_o)]\tilde{N}(c_o, r_o)}{N_1^2}(G_1 - G_s)^2$$

gives the variance for the case where the pixel values are constant within the landmark (i.e., $G_l$) and within the surround (i.e., $G_s$). The last equation shows that the variance is a minimum for the case $\tilde{N}=0$ corresponding to perfect registration. Unfortunately, the variance is also a minimum for the case $\tilde{N}=N_l$ corresponding to complete misregistration. In the last equation, the sensitivity of the variance to misregistration depends on $(G_l - G_s)^2$. This means that the minimum variance algorithm 23 does depend on the image contrast but is insensitive to contrast reversals.

The cross correlation algorithm 23, also known as a classical matched filter, is the most common technique used for image matching, and a paper by B. V. K. Vijaya Kumar, et al., entitled "Correlation Filters Minimizing Peak Location Errors", *J. Opt. Soc. A.,* vol. 9, No. 5, May 1992, shows that it is the most accurate algorithm for determining the feature location. In the landmark positioning system 20, the gray-scale image is multiplied by the shifted landmark bit mask and summed over the patch. This amounts to computing the average value of pixels within the landmark. The position estimate is taken to be that offset which maximizes the average value of pixels within the landmark perimeter. Cross correlation is sensitive to cloud cover interference only if it occurs on the landmark boundary.

The cross correlation matching algorithm 23 is defined by the equations:

$$\rho(c_o, r_o) = \frac{1}{N_t} \sum_{c=0}^{I-1} \sum_{r=0}^{J-1} L(c, r)G[(c + c_o), (r + r_o)]$$

$$\rho = (c_o, r_o) = \frac{1}{N_t} \sum_{(c,r) \in L(c_o, r_o)} G(c, r)$$

$$\rho(c_o, r_o) = \frac{N_1}{N_t}\overline{G}(c_o, r_o)$$

$$\rho(\hat{c}_o, \hat{r}_o) = \begin{array}{l} \text{Max}\,\rho(c_o, r_o) \text{ for } G_1 > G_s \\ \text{Min}\,\rho(c_o, r_o) \text{ for } G_1 < G_s \end{array}$$

$$\rho(c_o, r_o) = \frac{N_1}{N_t}\left[1 - \frac{(G_1 - G_s)\tilde{N}(c_o, r_o)}{G_1 N_1}\right]$$

where $(c,r) \in L(c_o, r_o)$ means all pixels in the image within the landmark perimeter offset by $(c_o, r_o)$.

According to the first equation the image is shifted by $(c_o, r_o)$ and multiplied by the landmark bitmap, and the sum of products is used as the match metric. Because $L(c,r)=0$ everywhere outside the landmark feature, the second and third equations show that ρ is proportional to the average value of pixels within the landmark perimeter. The fourth equation shows that the position estimate $(c_o, r_o)$ is that shift which maximizes ρ, the average value; for this reason, cross correlation is sometimes called the "maximum average" algorithm. The maximum value occurs when the perimeter is registered to landmark in the image.

The last equation gives the value of ρ for the case where the image has only two values. It shows that for $\tilde{N}=0$ (i.e., perfect registration) ρ is a maximum if $G_l > G_s$ and ρ is a minimum if $G_l < G_s$. The ambiguity caused by contrast reversal is eliminated by using an enhancement method described below. The second equation shows that the value of $\rho(c_o, r_o)$ is affected by clouds over the landmark boundary. This problem can be eliminated by a preprocessing operation that discards pixels in cloud-covered areas. Except for the centroid algorithm 23, the cross correlation algorithm 23 has the simplest implementation and was chosen for use in a reduced to practice embodiment of the system 20 and method 40.

The normalized cross correlation algorithm 23 is the same as cross correlation (maximum average) algorithm 23 except that both the image patch and the landmark mask are preprocessed to subtract the mean value and divide by the standard deviation for each offset. This normalization does not change the position estimate for landmarks which are enclosed and embedded in a homogenous surround. This is why the landmarks are chosen with these properties.

The normalized cross correlation algorithm 23 is defined by the equations:

$$\rho(c_o, r_o) =$$

$$\frac{1}{\sigma_G \sigma_L(c_o, r_o)N_t} \sum_{c=0}^{I-1} \sum_{r=0}^{J-1} G(c, r)\{L[(c + c_o), (r + r_o) - \overline{L}(c_o, r_o)]\}$$

$$\overline{G} = \frac{1}{N_t} \sum_{c=0}^{I-1} \sum_{r=0}^{J-1} G(c, r)$$

-continued $$\sigma_G^2 = \frac{1}{N_t} \sum_{c=0}^{I-1} \sum_{r=0}^{J-1} [G(c,r) - \overline{G}]^2$$

$$\overline{L}(c_o, r_o) = \frac{1}{N_t} \sum_{c=0}^{I-1} \sum_{r=0}^{J-1} L[(c+c_o),(r+r_o)]$$

$$\sigma_L^2(c_o, r_o) = \frac{1}{N_t} \sum_{c=0}^{I-1} \sum_{r=0}^{J-1} \{L[(c+c_o),(r+r_o)] - \overline{L}(c_o, r_o)\}^2$$

$$\rho(\hat{c}_o, \hat{r}_o) = \begin{matrix} \text{Max} \rho(c_o, r_o) \text{ for } G_l > G_s \\ \text{Min} \rho(c_o, r_o) \text{ for } G_l < G_s \end{matrix}$$

$$\rho(c_o, r_o) = (-1)^k \left[ 1 - \frac{N_t}{N_t - N_1} \frac{\tilde{N}(c_o, r_o)}{N_1} \right] \begin{matrix} G_l > G_s : k = 0 \\ G_l < G_s : k = 1 \end{matrix}.$$

The normalized cross correlation algorithm 23 is similar to cross correlation algorithm 23 except that the digitized input and landmark images are preprocessed to subtract their means and divide by their standard deviations. The sixth equation shows that the position estimate ($\hat{c}_o$, $\hat{r}_o$) is that shift which maximizes $\rho$ if $G_l > G_s$ and minimizes $\rho$ if $G_l < G_s$. The last equation gives the value of $\rho$ for the case where the image only has two values. It shows that for $G_l > G_s$ the value of $\rho$ is maximum when the images are perfectly registered ($\tilde{N} = 0$). The match metric of the normalized cross correlation algorithm 23 does not depend on the values $G_l$ and $G_s$. The advantage of the normalized cross correlation algorithm 23 is that it is intensity-independent and provides a robust figure-of-merit.

Figure 3A:
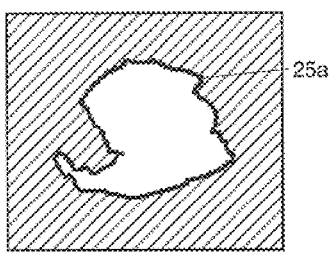
FIGS. 3a–3f are useful in illustrating the enhancement process used in the present invention.
Figure 3C:
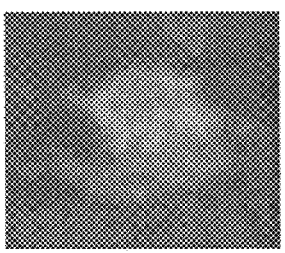
Figure 3E:
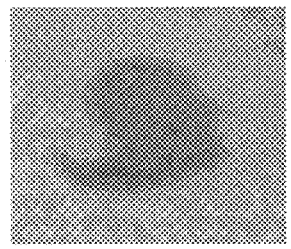
Figure 3B:
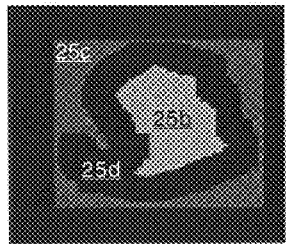

The optional enhancement method 25 or algorithm 25 used in the present invention is illustrated in FIGS. 3a–3f. The enhancement method 25 begins with a landmark outline 25a shown in FIG. 3a. It is obtained by connecting the stored vertices of the landmark with straight-line segments. The outline 25a is filled in to form a landmark bitmap. If there were no orbit and attitude errors, all pixels within the outline 25a would be landmark pixels and could be used to compute landmark statistics including a mean and standard deviation. Similarly, all pixels outside the boundary could be used to compute statistics for the surround. However, because of image registration errors, pixels near the border can be either landmark or surround and must be excluded from statistics computations. As is shown in FIG. 3b, the bitmap is divided into three regions. The inner area 25b is always aligned with landmark pixels. The outer area 25c is never aligned with landmark pixels (i.e., always contains surround pixels). The area 25d between the inner and outer areas 25b, 25c can contain either type of pixels and is not used for computing statistics.

Figure 3D:
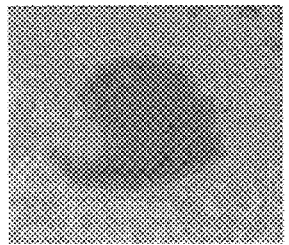
Figure 3F:
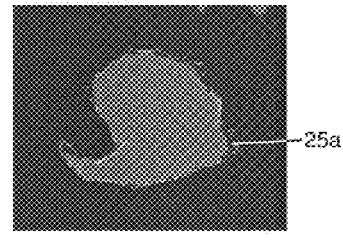

FIGS. 3c and 3e are patches of an infrared image of an island acquired at two different times. The images have very low contrast and the island changes from bright to dark over the course of 9.5 hours (i.e., there has been a contrast reversal). FIGS. 3d and 3f show the corresponding images after they have been enhanced using the enhancement algorithm 25. In the images shown in FIGS. 3d and 3f, the gray-scale value of a pixel corresponds to the likelihood that it is a landmark pixel. The enhanced images of FIGS. 3d and 3f have much higher contrast than their original counterparts shown in FIGS. 3c and 3e, and the contrast reversal has been corrected.

As shown in FIGS. 3c and 3e, the gray-scale values in an image change with time and are not a reliable indicator of whether the pixel is landmark or surround. The enhancement algorithm 25 uses "ground truth" information from the landmark bitmap to radiometrically calibrate the image to reduce the variations in the gray-scale values and make the enhanced image more robust.

The enhancement algorithm 25 converts gray-scale pixel values to likelihood ratio values. The following notation is used. G is the gray-scale value of the image patch after upsampling 24, E(G) is an enhanced image value, L, S correspond to the landmark and surround, P(L), P(S) are apriori probabilities of L and S, P(L/G), P(S/G) are aposteriori probabilities of L and S given G, P(G/L), P(G/S) are conditional probabilities of G given L and S, $M_l$, $M_s$ are mean values of landmark and surround pixels, $\sigma_l$, $\sigma_s$ are standard deviation of landmark and surround pixels, and $$\rho(G) = \frac{P(L/G)/P(S/G)}{P(L)/P(S)} = \frac{P(G/L)}{P(G/S)}.$$

In this equation, $\rho(G)$ is the ratio of aposteriori probabilities normalized by the ratio of apriori probabilities. It is a measure of how the likelihood a pixel is landmark increases as a result of observing the gray-scale value G. By using Bayes rule it can be shown that $\rho(G)$ is simply the ratio of conditional probabilities.

$$P(G/L) = \frac{1}{\sqrt{2\pi}\sigma_1} \text{Exp}[-1/2(G - M_1)^2/\sigma_1^2]$$

$$P(G/S) = \frac{1}{\sqrt{2\pi}\sigma_s} \text{Exp}[-1/2(G - M_s)^2/\sigma_s^2].$$

These equations represent the conditional probabilities as Gaussian distributions in terms of means and standard deviations of Landmark and Surround pixels. These values are obtained from training samples from the inside and outside areas, respectively, shown as 25b, 25c in FIG. 3b. This table gives parameters for the two patches shown in FIGS. 3c and 3e.

| Patch | Landmark | | Surround | |
| --- | --- | --- | --- | --- |
| | $M_l$ | $\sigma_l$ | $M_s$ | $\sigma_s$ |
| FIG. 3c | 199.9 | 4.81 | 170.5 | 4.37 |
| FIG. 3e | 193.9 | 2.58 | 222.2 | 2.35 |

$$\ln\rho(G) = \ln\frac{\sigma_1}{\sigma_s} - 0.5\left[\frac{(G - M_1)^2}{\sigma_1^2} - \frac{(G - M_s)^2}{\sigma_s^2}\right]$$

The last equation follows directly from the first three equations.

E(G)=181 for $\rho(G)$>200.0;

=128+10 ln[$\rho(G)$] for 0.005<$\rho(G)$>200.0;

and

=75 for $\rho(G)$<0.005.

The last equation gives E(G), the value of pixels in the enhanced image 25, in terms of the logarithm of $\rho(G)$, the normalized likelihood ratio, over the range 0.005≦$\rho(G)$ ≦200.0. FIGS. 3d and 3f show E(G) for the two patches of FIGS. 3c and 3e, respectively.

The likelihood ratio enhancement method can be extended to include use of multiple channels simply by replacing the second and third equations by their multivariate counterparts. In this case, the probability density functions are given in terms of mean vectors and covariance matrices which are derived from training masks. The result of this extension for two channels (e.g., infrared channels 2 and 4) is given in the following equation for a two channel likelihood ratio:

$$\ln[\rho(G_1, G_2)] = 0.5 \ln \frac{K_l}{K_s}$$
$$-0.5[k_{111}(G_1 - M_{1l})^2 + 2k_{121}(G_1 - M_{1l})(G_2 - M_{2l}) + 2k_{221}(G_2 - M_{2l})^2]$$
$$+ .5[k_{11s}(G_1 - M_{1s})^2 + 2k_{12s}(G_1 - M_{1s})(G_2 - M_{2s}) + 2k_{22s}(G_2 - M_{2s})^2]$$

where K is the inverse covariance matrix.

The operation of the present system 20 and method 40 will now be discussed. Using the CMTK geographic information system 27, once a feature (island or lake) having the proper size, shape, and orientation has been identified by an operator, the operator brings up a higher resolution display generated from an ADRG map made from 1:250,000 scale JOG hardcopy maps. The operator uses a cursor to trace around the island or lake by clicking on vertices (where the outline 25a changes direction). The CMTK geographic information system 27 extracts and stores the latitude and longitude of all selected vertices.

Displayed images formed using JOG maps are preferred for outlining because the hardcopy maps have an accuracy specification such that 90% of the points have location errors less than 250 meters (i.e., one-fourth of a visible line). The pixel spacing on the softcopy raster is 25 meters so that the operator can trace the outline 25a with negligible error. The landmarks are outlined only once because (to a first approximation) the perimeters do not change with diurnal and seasonal conditions.

The CMTK geographic information system 27 can process maps from the Digital Chart of the World (DCW), ARC Digitized Raster Graphics (ADRG), and Digital Terrain Elevation Data (DTED). In addition, the CMTK geographic information system 27 can process user-digitized hardcopy maps in GIF format input using the digitizer 29.

The mathematical model 21, described in an "Earth Location User's Guide", DRL504-11, published by Space Systems/Loral, Sep. 30, 1994, processes the latitude and longitude data provided by the CMTK geographic information system 27 and outputs line and pixel address in a digitized image patch. The mathematical model 21 requires accurate knowledge of parameters indicative of the position and attitude of the spacecraft 11. These parameters are derived using range measurements from known Earth locations and line-of-sight (LOS) measurements to known stars. The orbit and attitude parameters are further refined by fitting line and pixel image coordinates of salient features referred to as landmarks to their known latitude, longitude, and height on the Earth. This spatial calibration of an image is performed by the orbit and attitude tracking system 30. Once the orbit and attitude parameters have been determined, the nominal motion of the scan mirror in the imaging system 15 can be modulated to compensate for orbit and attitude errors to produce a metrically correct image.

In the manual mode used currently, the patch extraction circuit 17 extracts patches (256 lines by 256 pixels) from the incoming image and displays them on the interactive image display 18. The operator uses a cursor to delineate the line and pixel coordinates of a landmark designated on a hardcopy map. These image coordinates together with the geodetic Earth coordinates are input to the orbit and attitude tracking system 30 which computes orbit and attitude parameters. The orbit and attitude tracking system 30 also uses range measurements (i.e., distances from known Earth locations to the satellite) and star position data from the imaging system 15 in the tracking solution. The derived orbit and attitude data are used to predict satellite motions for periods up to one day. The predicted motions are input to the image motion compensation system 14 to modify the mirror pointing commands to the imaging system 15 to produce metrically correct images.

In the automatic mode provided by the present invention, 25 line by 40 pixel image patches are extracted from the image and processed by the landmark positioning system 20 to determine the line and pixel coordinates of the landmark. The automatic mode provides a number of advantages over the manual mode. The landmark positioning system 20 is superior to prior approaches in that landmarks in symbolic form are used (i.e., perimeters of lakes and islands) that are derived from precise cartographic source materials. The earlier approach used actual images from a previous cloud free acquisition as the landmark which had the following disadvantages. The true position of the image (in image coordinates) was ambiguous and was not accurately known. Also, several versions of the landmark were required corresponding to different acquisition conditions (e.g., different diurnal and seasonal conditions).

The landmark positioning system 20 upsamples 24 (magnifies) the image patch prior to performing image matching to improve the location accuracy. The optional enhancement process 25 was developed that is also applied to the image patch prior to the matching process. The enhancement algorithm can use the full 10-bit precision of the original image and convert it into a likelihood ratio based on radiometric calibration. Cloud pixels are detected on the basis of their brightness and eliminated from both the radiometric calibration and the subsequent matching process. This makes it possible to use the system even when the landmark is partially obscured by cloud cover.

More specifically, the landmark positioning system 20 processes image patches and landmark data in the form of perimeter vertices from landmark database 27. The system 20 produces a position estimate (in the form of offset errors from the expected location) and a figure of merit indicating the reliability and accuracy of the result. The processing begins by using the math model 21 of the imaging system 15 to compute the expected line and pixel coordinates of all perimeter vertices. These coordinates depend on the latitude, longitude, and height of the vertex and the current orbit and attitude solution. The vertex coordinates are upsampled 22 (magnified) and used to form a continuous outline 25a which is "filled in" to form a landmark mask (bit map).

An image patch is extracted from the incoming image sector by the image patch extraction process 17 which is upsampled (magnified) by the upsample and rasterizing process 22 seven times in lines (North-South) and four times in pixels (East-West). The upsampling 22 increases the positioning accuracy by reducing the effect of spatial quantization inherent in the landmark mask. The landmark mask is then used to extract (separately) pixels from inside and outside the landmark. The two sets of pixels are used to compute gray-scale statistics for the two regions, and these statistics are used in the optional image enhancement process 25. The upsampled, optionally enhanced patch image and the upsampled landmark mask are passed to one of six matching algorithms 23. The matching algorithms 23 determine the relative offset at which the image and the landmark mask are best matched.

A number of factors make the landmark positioning system 20 simpler than most image matching applications described in the literature, such as is described in a paper by C. D. Kuglin, et al. entitled "Map Matching Techniques for Terminal Guidance Using Fourier Phase Information", SPIE, vol. 186, Digital Processing of Aerial Images, 1979, and a paper by C. D. Kuglin entitled "Histogram-Based Algorithms for Scene Matching", SPIE, vol. 302, Infrared Technology for Target Detection and Classification (1981), for example. The first factor is that in the landmark positioning system 20, a designer selects the best features to match from a very large geographic area. This is much easier than reconnaissance image processing in which the regions to be matched are dictated by the application. This allows the designer to select very simple features consisting of a single enclosed object embedded in an extended homogenous background (called the surround).

Another simplifying characteristic is that the image is almost never misregistered by more than a few pixels. This reduces the required search range and reduces the computation time and the likelihood of a false matchpoint. Also, because of the very accurate control of the satellite and imaging sensors, the scale and orientation of the imagery is very accurately known. Eliminating scale factor and rotation errors preserves the sharpness of the correlation surface peak and improves the reliability and accuracy of image matching.

Another feature of the landmark positioning system 20 is that variations in pixel gray-scale values are reduced by a calibration process that is customized for each acquisition. This is made possible by the fact that the landmark mask provides ground truth information necessary to compute separate statistics for pixels within the landmark and the surround. This self-calibration procedure eliminates contrast reversals and other gray-scale variations caused by different acquisition conditions (e.g., different diurnal and seasonal conditions).

The landmark positioning system 20 is capable of sub-pixel accuracy on the order of 250 meters for the visible channel, and it achieves this accuracy in the presence of partial cloud cover. Furthermore, the likelihood of cloud cover is reduced by using smaller landmarks (i.e., 12 Km for the visible channel). About 170 landmarks are suitable for use with the visible and infrared imaging channels of the imaging system 15. This greatly increases the likelihood of finding multiple cloud-free landmarks in any particular image frame.

Landmark selection is accomplished using the Digital Chart of the World (DCW) stored in the softcopy map database 28 along with the CMTK geographic information system 27. The DCW is a worldwide, seamless, thematic, vector map derived from hardcopy maps at a scale of 1:1,000,000. The modified CMTK system used in the landmark positioning system 20 creates an icon that represents a 12-line by 21-pixel imager footprint on the ground for either visible or infrared images derived from the imaging system 15 on the spacecraft 11. This footprint is superimposed on the displayed DCW map and allows the operator to judge whether the candidate island or lake has the required size, shape, and orientation.

Once a feature with the proper size, shape, and orientation has been identified, the operator brings up a higher resolution display generated from the ADRG map made from the 1:250,000 scale Joint Operation Graphic (JOG) hardcopy maps. The operator uses the cursor to trace around the island or lake by clicking on vertices (i.e., where the outline 25a changes direction). The CMTK geographic information system 27 extracts and stores the latitude and longitude of all vertices. Displays formed using the JOG hardcopy maps are preferred for outlining because the hardcopy maps have an accuracy specification such that 90% of the points have location errors less than 250 meters (i.e., one-fourth of a visible line). The pixel spacing on the softcopy raster is 25 meters so that the operator can trace the outline 25a with negligible error.

As mentioned previously, only islands and lakes are used as landmarks. This is due to the large difference in gray-scale values between land and water. They also have the important characteristic that they are closed features embedded in a homogeneous surround. These characteristics are very advantageous because they eliminate nonstationarity or "edge effect" in the cross correlation function. This effect is caused when the edge of a patch passes through an extended high-contrast feature.

It is also important that the landmark have the proper size, shape, and orientation. It is best to locate square or round features that span approximately 12 lines and 21 pixels in the image. This size ensures that the landmark mask covers at least two-thirds of the feature in each direction in the image, even at maximum allowable misregistration (i.e., ±4 lines and ±7 pixels). The landmarks are spatially distributed throughout the image frame. This is necessary in order to obtain a robust solution for the orbit and attitude parameters. An additional constraint is that the elevation angle (measured from horizontal) of the line-of-sight from the landmark to the satellite 11 is typically at least 30 degrees. At lower elevation angles the spatial distortion (i.e., foreshortening along the line-of-sight) becomes a problem. Also, obscuration of the landmark perimeter occurs if there is significant terrain relief along the line-of-sight. Still another desirable attribute of a landmark is that it is cloud free a large percentage of the time.

Figure 4:
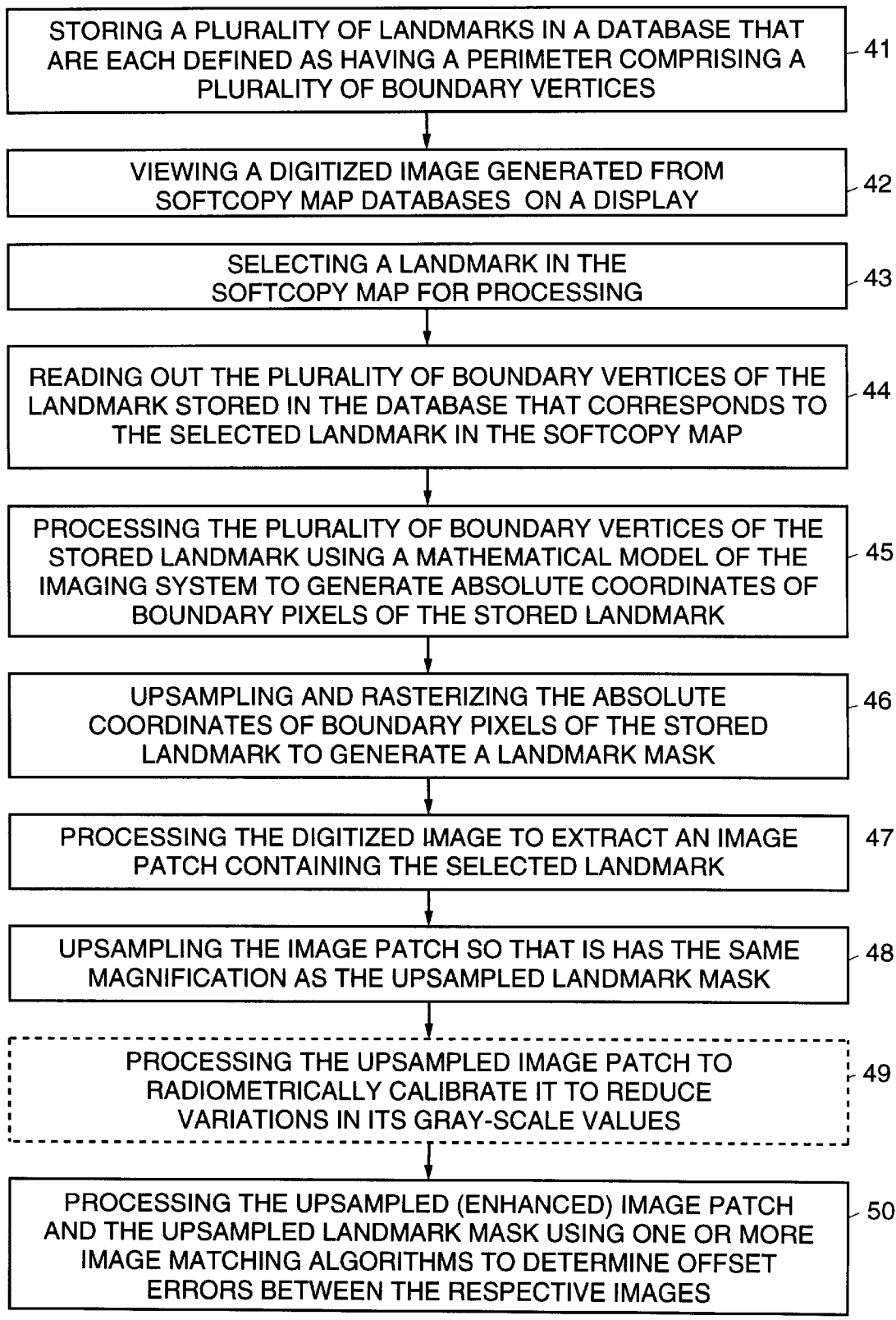
FIG. 4 is a process flow diagram illustrating a processing method used in the landmark position system of FIG. 2.

For the purposes of completeness, FIG. 4 is a process flow diagram illustrating a processing method 40 used in the landmark position system 20 of FIG. 2. The processing method 40 is used in determining offset errors between line and pixel coordinates of landmarks in a digitized image generated by an imaging system 15 disposed on a spacecraft 11 and line and pixel coordinates predicted by the mathematical model 21, which offset errors may be used to more accurately point the imaging system 15 and comprises the following steps.

A plurality of landmarks are defined and stored (step 41) in a landmark database 27 that are each defined as having a perimeter comprising a plurality of boundary vertices. The digitized image generated from softcopy map databases 28 is viewed (step 42) on a display and a landmark in the digitized image is selected (step 43) for processing. The plurality of boundary vertices of the landmark stored in the landmark database 28 that corresponds to the selected landmark in the digitized image is read out (step 44) of the database 28. The plurality of boundary vertices of the stored landmark are processed (step 45) by a mathematical model of the imaging system to generate absolute coordinates of boundary pixels of the stored landmark. The absolute coordinates of boundary pixels of the stored landmark are upsampled and rasterized (step 46) to generate a landmark mask.

The digitized GOES image is processed (step 47) to extract an image patch containing the selected landmark. The image patch is then upsampled (step 48) so that it has the same magnification as the upsampled landmark mask. Optionally, the upsampled image patch is processed (step 49) to radiometrically calibrate the image patch to reduce variations in its gray-scale values. The upsampled image patch or the enhanced upsampled image patch and the upsampled landmark mask are processed (step 50) by one or more image matching algorithms to determine offset errors between the respective images. A figure of merit may also be generated that is indicative of the reliability and accuracy of the computed offset values.

The offset errors are subsequently processed to adjust the pointing direction of the imaging system. The offset errors are processed by an orbit and attitude tracking system that generates coefficients used for satellite orbit and attitude prediction. The coefficients are processed onboard the satellite by an orbit and attitude computation system and an image motion compensation system to generate pointing commands that are used to adjust the pointing direction of the imaging system.

Thus, a system and method for processing digitized images generated by a satellite-based imaging system to automatically locate landmarks in the images that are used to determine the position and attitude of the imaging system has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A method of determining offset errors between line and pixel coordinates of landmarks in a digitized image generated by a passive imaging system disposed on a spacecraft and line and pixel coordinates predicted by a mathematical model of the imaging system, said method comprising the steps of:

defining and storing a plurality of landmarks in a landmark database that are each defined as having a perimeter comprising a plurality of boundary vertices;

generating a digitized image of a softcopy map derived from a database that is viewed on a display;

selecting a landmark in the softcopy map for processing;

reading out the plurality of boundary vertices of the landmark stored in the landmark database that corresponds to the selected landmark in the softcopy map;

processing the plurality of boundary vertices of the stored landmark using a mathematical model of the passive imaging system to generate absolute coordinates of boundary pixels of the stored landmark;

upsampling and rasterizing the absolute coordinates of boundary pixels of the stored landmark to generate a landmark mask;

processing the digitized image derived from the passive imaging system to extract an image patch containing the selected landmark;

upsampling the image patch so that it has the same magnification as the upsampled landmark mask; and processing the upsampled image patch and the upsampled landmark mask by an image matching algorithm to determine offset errors between the respective images.

2. The method of claim 1 further comprising the step of:

processing the upsampled image patch to radiometrically calibrate the image patch to reduce variations in its gray-scale values.

3. The method of claim 1 wherein the step of processing the upsampled image patch and the upsampled landmark mask by an imaging matching algorithm further comprising generating a figure of merit that is indicative of the reliability and accuracy of the computed offset errors.

4. The method of claim 1 wherein the image matching algorithm is selected from a group consisting of a centroid image matching algorithm, an edge matching algorithm, a cluster reward algorithm, a minimum variance algorithm, a cross correlation algorithm, and a normalized cross correlation algorithm.

5. The method of claim 1 which further comprises the step of:

processing the offset errors to adjust the pointing direction of the imaging system.

6. The method of claim 1 wherein the step of processing the offset errors further comprises the steps of:

processing the offset errors using an orbit and attitude tracking system that generates coefficients used for spacecraft orbit and attitude prediction;

processing the coefficients onboard the spacecraft using an orbit and attitude computation system to generate predicted orbit and attitude compensation data; and generating pointing coordinates using an image motion compensation system to adjust the pointing direction of the imaging system.

7. A system for determining offset errors between line and pixel coordinates of landmarks in a digitized image generated by a passive imaging system disposed on a spacecraft and line and pixel coordinates predicted by a mathematical model of the imaging system, said system comprising:

a landmark database that stores a plurality of landmarks that are each defined as having a perimeter comprising a plurality of boundary vertices;

a display for viewing the digitized image generated from softcopy map databases;

imaging extraction means for processing the digitized image derived from the passive imaging system to extract an image patch therefrom that contains a selected landmark; and a landmark position system comprising a computer for reading the plurality of boundary vertices of the landmark in the landmark database that corresponds to the selected landmark in the digitized image derived from the passive imaging system, for processing the plurality of boundary vertices of the stored landmark using the mathematical model of the imaging system to generate absolute coordinates of boundary pixels of the stored landmark, for upsampling and rasterizing the absolute coordinates of boundary pixels of the stored landmark to generate a landmark mask, for processing the digitized image derived from the passive imaging system to extract an image patch containing the selected landmark, for upsampling the image patch so that it has the same magnification as the upsampled landmark mask, and for processing the upsampled image patch and the upsampled landmark mask by an image matching algorithm to determine offset errors between the respective images.

8. The system of claim 7 wherein the computer further comprises means for processing the upsampled image patch to radiometrically calibrate the image patch to reduce variations in its gray-scale values.

9. The system of claim 7 wherein the computer further comprises means for generating a figure of merit is also generated that is indicative of the reliability and accuracy of the computed offset values.

10. The system of claim 7 wherein the image matching algorithm is selected from a group consisting of a centroid image matching algorithm, an edge matching algorithm, a cluster reward algorithm, a minimum variance algorithm, a cross correlation algorithm, and a normalized cross correlation algorithm.

11. The system of claim 7 further comprising means for processing the offset errors to adjust the pointing direction of the imaging system.

12. The system of claim 11 wherein the means for processing the offset errors comprises:

an orbit and attitude tracking system for processing the offset errors to generate coefficients used for spacecraft orbit and attitude prediction;

an orbit and attitude computation system disposed on the spacecraft for processing the coefficients to generate predicted orbit and attitude compensation data; and an image motion compensation system disposed on the spacecraft for generating pointing commands that adjust the pointing direction of the imaging system.

13. A method of determining offset errors between line and pixel coordinates of landmarks in a digitized image generated by an imaging system disposed on a spacecraft and line and pixel coordinates predicted by a mathematical model of the imaging system, said method comprising the steps of:

defining and storing a plurality of landmarks in a landmark database that are each defined as having a perimeter comprising a plurality of boundary vertices;

generating a digitized image of a softcopy map derived from a database that is viewed on a display;

selecting a landmark in the softcopy map for processing;

reading out the plurality of boundary vertices of the landmark stored in the landmark database that corresponds to the selected landmark in the softcopy map;

processing the plurality of boundary vertices of the stored landmark using a mathematical model of the imaging system to generate absolute coordinates of boundary pixels of the stored landmark;

upsampling and rasterizing the absolute coordinates of boundary pixels of the stored landmark to generate a landmark mask;

processing the digitized image to extract an image patch containing the selected landmark;

upsampling the image patch so that it has the same magnification as the upsampled landmark mask; and processing the upsampled image patch and the upsampled landmark mask by an image matching algorithm to determine offset errors between the respective images, which processing includes generating a figure of merit that is indicative of the reliability and accuracy of the computed offset errors.

14. The method of claim 13 further comprising the step of:

processing the upsampled image patch to radiometrically calibrate the image patch to reduce variations in its gray-scale values.

15. The method of claim 13 wherein the image matching algorithm is selected from a group consisting of a centroid image matching algorithm, an edge matching algorithm, a cluster reward algorithm, a minimum variance algorithm, a cross correlation algorithm, and a normalized cross correlation algorithm.

16. The method of claim 13 which further comprises the step of:

processing the offset errors to adjust the pointing direction of the imaging system.

17. The method of claim 13 wherein the step of processing the offset errors further comprises the steps of:

processing the offset errors using an orbit and attitude tracking system that generates coefficients used for spacecraft orbit and attitude prediction;

processing the coefficients onboard the spacecraft using an orbit and attitude computation system to generate predicted orbit and attitude compensation data; and generating pointing coordinates using an image motion compensation system to adjust the pointing direction of the imaging system.

18. A system for determining offset errors between line and pixel coordinates of landmarks in a digitized image generated by an imaging system disposed on a spacecraft and line and pixel coordinates predicted by a mathematical model of the imaging system, said system comprising:

a landmark database that stores a plurality of landmarks that are each defined as having a perimeter comprising a plurality of boundary vertices;

a display for viewing the digitized image generated from softcopy map databases;

imaging extraction means for processing the digitized image to extract an image patch therefrom that contains a selected landmark; and a landmark position system comprising a computer for reading the plurality of boundary vertices of the landmark in the landmark database that corresponds to the selected landmark in the digitized image, for processing the plurality of boundary vertices of the stored landmark using the mathematical model of the imaging system to generate absolute coordinates of boundary pixels of the stored landmark, for upsampling and rasterizing the absolute coordinates of boundary pixels of the stored landmark to generate a landmark mask, for processing the digitized image to extract an image patch containing the selected landmark, for upsampling the image patch so that is has the same magnification as the upsampled landmark mask, and for processing the upsampled image patch and the upsampled landmark mask by an image matching algorithm to determine offset errors between the respective images including generating a figure of merit that is indicative of the reliability and accuracy of the computed offset errors.

19. The system of claim 7 wherein the computer further comprises means for processing the upsampled image patch to radiometrically calibrate the image patch to reduce variations in its gray-scale values.

20. The system of claim 7 wherein the image matching algorithm is selected from a group consisting of a centroid image matching algorithm, an edge matching algorithm, a cluster reward algorithm, a minimum variance algorithm, a cross correlation algorithm, and a normalized cross correlation algorithm.

* * * * *